Patented Dec. 4, 1945

2,390,316

UNITED STATES PATENT OFFICE 2,390,316

ACID RECOVERY PROCESS

Henry O. Mottern, Hillside, N. J., assignor to Standard Oil Development Company, a corporation of Delaware No Drawing. Application October 7, 1942,
Serial No. 461,230

3 Claims. (Cl. 23—172)

The present invention relates to a process for reconditioning and recovering spent acids, and, more particularly, the invention involves a process for recovering spent sulfuric acid which has been used in an olefin hydration process.

Olefin hydration processes, in brief, consist in the absorption of olefin in 60–98% sulfuric acid, which forms an extract of alkyl acid esters. The concentrated extract is then diluted with water to an acid concentration of 35–50% acid strength on an olefin-free basis, hydrolyzed and steam stripped to recover olefin hydration products. The residue from the distillation step is a weak acid, commonly designated as slop acid, and is drained from the still. The weak acid contains from 1 to 5% of carbon in several forms, that is alcohol, ketone, sulfonic acid, hydroxy, and polyhydroxy sulfonic acid, resin and tar. Restoration of such acid without specific decarbonization treatment yields a strong acid which is not suitable for re-use for olefin absorption because of its high carbon content, which would precipitate as elemental carbon upon dilution of the strong acid after further olefin absorption. Where sulfuric acid is re-used for olefin absorption it is most desirable to use a reclaimed acid containing not more than 0.2% carbon, and preferably the concentration of carbon should be 0.1% or less. Present practice in the reconditioning of weak acid calls for concentrating the acid to an 88–98% acid strength, and then decarbonization by either bleaching the acid by chemical agents or by the prolonged digestion of the acid restored to an acid concentration of from 88–98% acid strength by evaporation or fortification with $SO_3$ which causes considerable loss of sulfuric acid as $SO_2$. Restoration of the weak acid through bleaching is accomplished by concentrating the weak acid to about 88% acid concentration, then adding an excess of nitric acid and heating to 210° C. to oxidize the carbonaceous material present in the acid. The amount of nitric acid required by this method is not uniform, and it often requires twice as much nitric acid to obtain complete oxidation of the carbonaceous material as that theoretically required judging from a total carbon content of the weak acid. When the mixture of sulfuric and nitric acids is heated as the final bleaching step all of the nitric acid present is lost either as nitrogen or nitrogen oxides. This process results in a good recycle acid, but the cost in nitric acid is excessive.

The principal object of the present invention is to accomplish the bleaching of recycled sulfuric acid with nitric acid, such bleaching being accomplished without the loss of substantial quantities of nitric acid. This and other objects will be apparent to those skilled in the art upon reading the following description and claims.

According to the present invention the bleaching of recycle acid is accomplished by adding the bleaching agent, in an amount only slightly in excess over that theoretically required to oxidize the carbonaceous material present in the weak acid, to the weak acid as it leaves the alcohol still. The mixture of weak acid and nitric acid is then heated. At temperatures up to 105° C. a preliminary oxidation occurs yielding NO and $NO_2$. As the temperature rises, a mixture of water and nitric acid is distilled off from which a constant boiling mixture of nitric acid and water is recovered by fractional distillation. At 146° C. the weak acid has been concentrated to an acid concentration of approximately 65% on an olefin-free basis. Heating is then continued and the acid mixture further concentrated to an acid concentration of 80% on an olefin-free basis which is reached at a temperature of approximately 205° C. As the acid concentration is raised from 65% to that of approximately 80%, various nitrogen oxides are liberated along with some water vapors. These nitrogen oxides together with any water vapors present are then conducted to an absorption tower where they are contacted with water or weak sulfuric acid from the olefin hydration process in countercurrent flow. They are here absorbed and converted to nitric acid according to the following equations:

$$2NO + O_2 \rightarrow 2NO_2$$

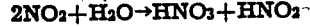
$$2NO_2 + H_2O \rightarrow HNO_3 + HNO_2$$

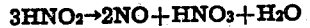
$$3HNO_2 \rightarrow 2NO + HNO_3 + H_2O$$

A small amount of air or free oxygen should be fed into the absorption tower along with the oxides of nitrogen to furnish the oxygen requisite for the conversion of the oxides to nitric acid. The nitrogen oxides liberated during the preliminary oxidation are converted to nitric acid in the same manner. After a sulfuric acid concentration of 80% has been reached and all of the remaining nitric acid has been liberated as oxides of nitrogen, the sulfuric acid is then in a condition where it can be further concentrated up to 88–92% acid concentration. The sulfuric acid at this concentration can then be used, without further treatment, for recycling to an olefin absorption system. The process can be run either continuous or on the batch principle with very little loss of nitric acid.

As has been previously stated, the weak acid drained from the steam still in an olefin hydration process has a sulfuric acid content of from 35 to 55% strength on an olefin-free basis and contains from 1–5% of carbonaceous material. Concentrated nitric acid is then added to the weak acid in an amount equal to 5 to 25% based on the $H_2SO_4$ present in the weak acid figured as 100%, where the organic material content in the weak acid is from 1 to 5%. Dilute nitric acid, recycle nitric acid or nitrogen oxides may be used instead of concentrated nitric acid if care is taken to maintain the $HNO_3$ in slight excess, over that required to oxidize the carbonaceous material. The weak acid is drained from the steam distillation still at a temperature within a few degrees of 100° C. and is run along with the added nitric acid into an externally heated still equipped with a fractionating tower. The acids are thus heated to cause the preliminary oxidation and are then concentrated as previously described, and an amount of a constant boiling mixture of nitric acid and water (B. P. 105°–110° C.) is recovered as a distillate. After the sulfuric acid in the still has attained an acid concentration of about 65%, various oxides of nitrogen begin to be liberated. If the process is being operated as a batch process, these nitrogen oxides are absorbed in water to which oxygen has been added to convert them to nitric acid. However, in a continuous method the oxides would be absorbed in the weak acid feed where they are converted to nitric acid. By returning the nitrogen oxides and the constant boiling nitric acid mixture to fresh weak acid feed at least 98% of the original nitric acid charged is conserved.

The following specific example is given for the purpose of illustrating the principles of this invention.

Example

A weak sulfuric acid, recovered from the secondary butyl alcohol steam stripping still, containing 1.10% carbon as carbonaceous material, was mixed with concentrated nitric acid in the following proportions:

$H_2SO_4$ (44.75%) = 665.4 g.

$HNO_3$ (70.5%) = 24.3 g. = 17.15 g. 100% $HNO_3$

The acid mixture was placed in a still equipped with a fractionating column and heated. As the temperature passed through the range of 80–105° C. oxidation became rapid and NO and $NO_2$ gases were given off. For purposes of calculation these oxides were absorbed in NaOH solution. Distillation was continued to concentrate the acid. Between 105–110° C. a distillate containing 2.1 g. of $HNO_3$ was recovered. After sufficient water had been removed to bring the sulfuric acid strength to 80–81% a further oxidation took place resulting in the production of additional NO and $NO_2$. These oxides were also absorbed in the NaOH solution and the total quantity of NO and $NO_2$ was determined by titration. 14.75 g. of $HNO_3$ were recovered as NO and $NO_2$. The total $HNO_3$ recovered was 16.85 g. or 98.2% of the nitric acid charged. Distillation was continued until the sulfuric acid content reached 92%. 325 g. of 92% sulfuric acid having a carbon content of .028% were recovered.

What is claimed is:

1. The method of reconditioning weak solutions of sulfuric acid containing carbonaceous material which comprises adding nitric acid to the weak acid, heating the acid mixture while oxides of nitrogen are evolved, concentrating the acid to a sulfuric acid concentration of 80–81% while recovering a constant boiling mixture of nitric acid and water, further heating the mixture to evolve oxides of nitrogen and after oxides of nitrogen cease to evolve concentrating the acid to a sulfuric acid concentration of 88–92%.

2. The method of reconditioning weak solutions of sulfuric acid containing carbonaceous material which comprises adding to the weak acid an amount of nitric acid slightly in excess of the amount theoretically required to oxidize the carbonaceous material present in the weak acid, heating the acid mixture while oxides of nitrogen are evolved, concentrating the acid to a sulfuric acid concentration of 80–81% while recovering a constant boiling mixture of nitric acid and water, further heating the mixture to evolve oxides of nitrogen, returning the nitric acid and nitrogen tetraoxide to fresh weak acid and after oxides of nitrogen cease to evolve concentrating the sulfuric acid to an acid concentration of 88–92%.

3. The method of reconditioning weak solutions of sulfuric acid containing carbonaceous material which comprises adding to the weak acid an amount of nitric acid slightly in excess of the amount theoretically required to oxidize the carbonaceous material present in the weak acid, heating the acid mixture to a temperature of 105° C. while oxides of nitrogen are evolved, which oxides are returned to fresh weak solutions of sulfuric acid, concentrating the acid to a sulfuric acid concentration of 80–81% while recovering a mixture of nitric acid and water boiling between 105–110° C. which nitric acid and water mixture is returned to fresh weak acid, further heating the mixture to evolve oxides of nitrogen which are returned to fresh weak acid as nitrogen tetraoxide and after oxides of nitrogen cease to evolve concentrating the acid to a sulfuric acid concentration of 88–92%.

HENRY O. MOTTERN.